United States Patent Office 3,336,283
Patented Aug. 15, 1967

3,336,283
DYES CONTAINING DIHALOPYRIMIDINO GROUPS
Hermann Weissauer, Ludwigshafen (Rhine), Germany, assignor to Badische Anilin- & Soda-Fabrik Aktiengesellschaft, Ludwigshafen (Rhine), Germany
No Drawing. Filed Feb. 28, 1964, Ser. No. 348,300
Claims priority, application Germany, Mar. 6, 1963, B 71,006
9 Claims. (Cl. 260—154)

This invention relates to new dyes of the azo, anthraquinone and phthalocyanine series which contain one or two dihalopyrimidino groups and to a process for the production of these dyes.

British patent specification No. 822,047 and Belgian patent specification No. 587,308 describe dyes containing dichloropyrimidino groups which contain the dichloropyrimidino radical attached to the aromatic dye radical via carboxylic amide and amino groups. Dyes of this type may be fixed wash-fast on cellulose fibers by the conventional dyeing methods for reactive dyes. Their reactivity is not entirely satisfactory however. Since high reactivity is being required to an increasing extent from reactive dyes, so that the fixing periods can be shortened, dyes having high reactivity are sought after which can be fixed in high yield on the textile material within short fixing periods. At the same time these dyes should have good stability in alkaline dye liquors and printing pastes.

The preferred dyes of this invention contain one or two dihalopyrimidino groups which may be connected with the chromophoric moiety via a methylene bridge. They have the general formula $$D \text{-}[(CH_2)_n\text{—}Z]_m \qquad I$$

in which D denotes the said chromophoric moiety and contains or consists of the radical of an azo, anthraquinone or phthalocyanine dye, Z is a dihalopyrimidino radical, such as a radical having one of the formulae:

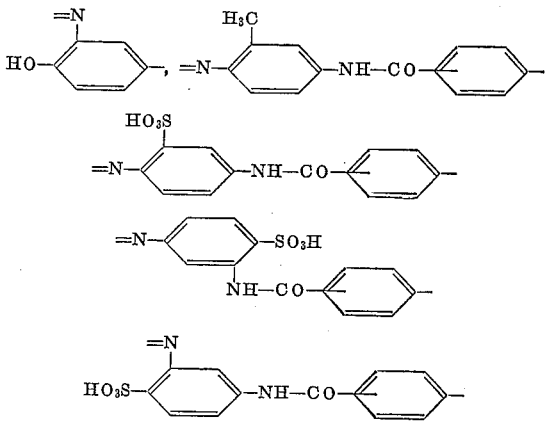

$m$ is 1 or 2 and $n$ is zero or 1. The group $[(CH_2)_n\text{—}Z]$ is attached to an aromatic carbon atom of a radical of an azo, anthroquinone or phthalocyanine dye either directly or by way of an aromatic or heterocyclic bridging group, such as an aromatic or heterocyclic group having five or six ring members.

In the new azo dyes having the general Formula I, D stands for a chromophoric moiety of an azo dye containing or consisting of the radical of a monoazo or diazo dye which may be metallized. D preferably stands for the radical of a monoazo dye having one to three sulfonic acid groups which contains a benzene derivative as the diazo component and a naphthol sulfonic acid or a pyrazolone compound as the coupling component.

Monoazo dyes having the general formula:

$$R\text{—}N=B\text{—}(CH_2)_n\text{—}Z \qquad II$$

are of particular interest in which R stands for the radical of a coupling component having one to three sulfonic acid groups, B denotes one of the bridging groups:

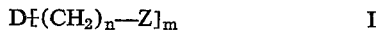

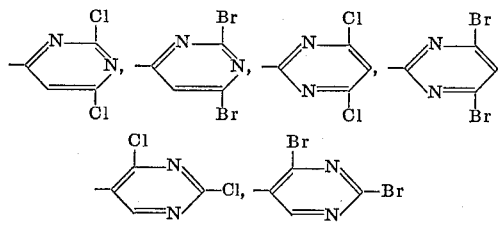

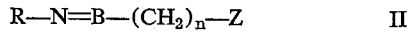

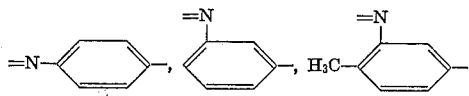

and Z and $n$ have the meanings given above.

Of the anthraquinone dyes having the general Formula I, those are preferred which have the general formula:

$$E\text{-}[X\text{—}Y\text{—}(CH_2)_n\text{—}X]_m \qquad III$$

in which Y denotes an aromatic or heterocyclic radical having five or six ring members preferably a 1,4-phenylene, 1,3-phenylene or 1,2-phenylene radical, X denotes the bridging group —NHSO$_2$— or —NH—CO—, E denotes the radical of an anthraquinone derivative containing one to three sulfonic acid groups, and Z and $m$ have the meanings given above.

Phthalocyanine dyes having the general Formula I are particularly dyes having the general formula:

$$E'\text{-}[X\text{—}Y\text{—}(CH_2)_n\text{—}Z]_m \qquad IV$$

in which E' denotes the radical of a phthalocyanine dye having one to six sulfonic acid groups and Y, X, Z, $m$ and $n$ have the meanings given above.

The new dyes may be obtained by introducing one or two radicals having the general formula:

$$\text{—A—}(CH_2)_n\text{—}Z \qquad V$$

in which A denotes an aromatic or heterocyclic radical having five or six ring members and Z and $n$ have the meanings given above, into a dye of the azo, anthraquinone or phthalocyanine series, or into an intermediate for such a dye, and, when an intermediate has been used, completing the formation of the dye from the reaction product. A may for example be an aromatic or heterocyclic radical which may consists of a six-membered ring, a five-membered ring or two six-membered rings connected together by —NH—CO— or

—SO$_2$—NH— bridges, and which may contain substituents such as halogen atoms, methyl groups, methoxy groups, hydroxyl groups, carboxyl groups, sulfonamide groups or sulfonic acid groups.

The introduction of the radical V into a dye or dye intermediate may take place for example by reacting an amine having the general formula:

$$H_2N\text{—}A\text{—}(CH_2)_n\text{—}Z \qquad VI$$

in which A, Z and $n$ have the meanings given above with a dye or dye intermediate which contains one or two radicals which will react with amino groups, or with diazotized amines, or by reacting the diazonium compound of the amine of Formula VI with a compound capable of coupling.

Amines having the Formula VI may be obtained for example from the corresponding nitro compounds by reducing the nitro group, advantageously in a solvent in the presence of hydrogenation catalysts, for example Raney nickel, or from the corresponding acylamines by elimination of the acyl radical under mild conditions.

Examples of amines of this type are the compounds having the formulae:

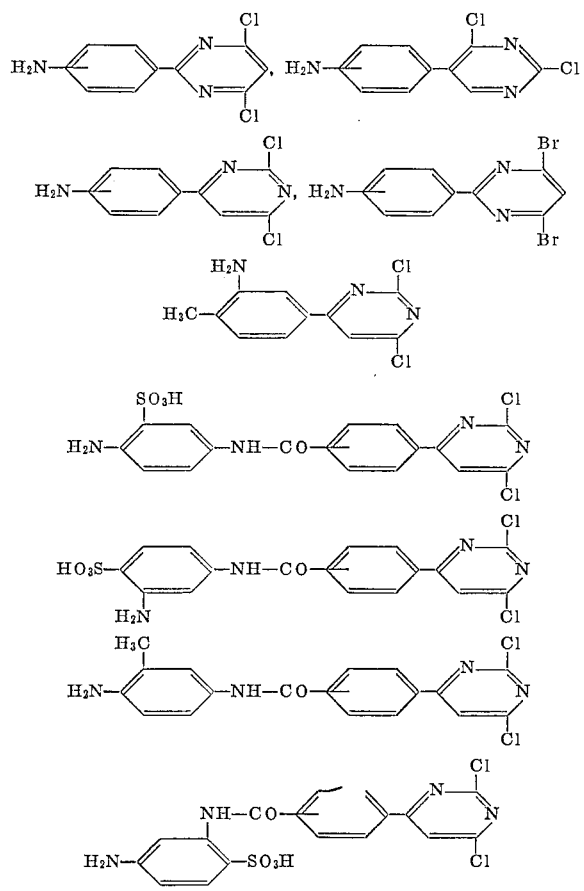

and

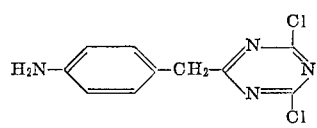

The carbocyclic rings of these compounds may contain other substituents, for example halogen atoms, hydroxyl groups, methyl groups, methoxy groups, carboxy groups, sulfonamide groups and/or sulfonic groups.

Another possibility for introducing the radical V into dyes or dye intermediates consists in reacting compounds having the general formula:

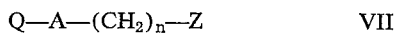

in which Q denotes a radical which will react with an acylatable amino group, as for example a halogen atom, a carboxylic halide radical, a sulfonic halide radical, an isocyanate radical or a urethane radical, and A, Z nd $n$ have the meanings given above, with dyes or dye intermediates containing one or two acylatable amino groups.

Compounds having the general Formula VII in which Q denotes a carboxylic chloride or sulfonic chloride group are obtained for example from the corresponding carboxyphenyldihydroxypyrimidines, sulfophenyldihydroxypyrimidines, carboxyphenyldichloropyrimidines or sulfophenyldichloropyrimidines by conventional methods by the action of acid chlorides, such as phosphorus pentachloride, phosphorus oxychloride, phosphorus trichloride, thionyl chloride or phosgene, if necessary with the addition of tertiary bases, such as pyridine, dimethylformamide, N-methylpyrrolidone, diethylaniline or tripropylamine. They may also be obtained by introducing sulfonic halide groups by conventional methods, or by introducing carboxylic halide groups, for example by the action of phosgene or oxalyl chloride in a melt of anhydrous aluminum chloride with the addition of alkali metal halides, into compounds having the general formula:

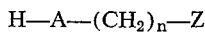

in which A, Z and $n$ have the meanings given above. For example by starting from 4-phenyl-2,6-dichloropyrimidine, a 4-(carboxyphenyl)-2,6-dichloropyrimidine is obtained in which the carboxyl group may be in ortho-, meta- or para-position. Compounds having the Formula VII in which Q denotes an isocyanate group or a urethane group are obtained for example by conventional methods from amines having the Formula VI by reaction with phosgene or esters of chloroformic acid. Aminophenyldihydroxypyrimidines may also be converted with phosgene into compounds having the Formula VII in a single operation.

Examples of compounds having the general Formula VII are:

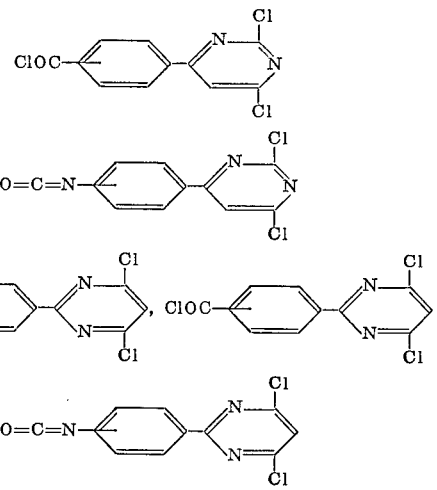

and

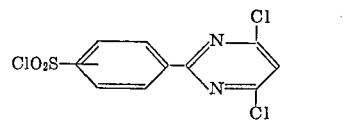

Examples of compounds having the general Formula VII in which Q denotes a halogen atom are compounds having the formulae:

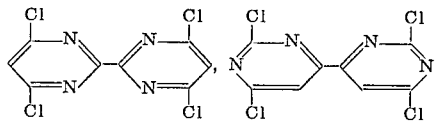

and

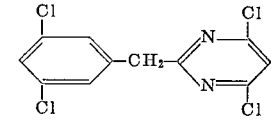

Reaction of compounds having the Formula VI with dyes or dye intermediates containing radicals which will react with amino groups, or reaction of compounds having the general Formula VII with dyes or dye intermediates containing amino groups may be carried out under conventional conditions, for example in aqueous solution or suspension, in organic solvents or mixtures of water and organic solvents, advantageously in the presence of acid-binding agents, such as alkali metal hydroxides, alkali metal carbonates, alkali metal hydrogen carbonates, alkali metal acetates or tertiary bases, such as dimethylformamide or pyridine.

Dyes which couple with amines having the Formula VI are particularly dyes of the azo, anthraquinone and tetrazaporphin series which contain radicals which will react with amines having the Formula VI, such as halogen atoms, carboxylic halide groups, sulfonic halide groups, carboxylic anhydride groups, chloromethyl groups and/or diazo groups. Examples of such dyes are 1,4 - bis - arylaminoanthraquinones, 1,5 - bis - arylaminoanthraquinones, 1,4-bis-thioarylanthraquinones, and 1,5-bis-thioarylanthraquinones bearings sulfonic halide groups or halomethyl groups, carboxylic halides of the anthraquinone series, such as 1-amino-4-nitroanthraquinone-2-carboxylic chloride, 1-aminoanthraquinone-2-carboxylic chloride, and also 1-amino-2-sulfo-4-(chlorosulfophenylamino)-anthraquinones, 1-amino-4-bromoanthraquinone-2-sulfonic acid and 1-amino-4-bromoanthraquinone-2,5(6 or 7 or 8)-disulfonic acids, and also the carboxylic halides and sulfonic halides of metal-free tetrazaporphins or of metalliferrous tetrazaporphins which are resistant to concentrated sulfuric acid, such as phthalocyanine disulfonic, trisulfonic and tetrasulfonic halides in which the sulfonic acid radical may be attached in the 3-position or the 4-position, particularly copper phthalocyanine tetrasulfonic chloride, copper phthalocyanine tetrasulfonic dichloride, nickel phthalocyanine trisulfonic and tetrasulfonic chlorides, monophenyl copper, diphenyl copper, triphenyl copper, tetraphenyl copper, monophenyl nickel, diphenyl nickel, triphenyl nickel and tetraphenyl nickel phthalocyanine tetrasulfonic chlorides, tetraphenyl copper phthalocyanine hexasulfonic chloride, tetraphenylmercapto copper phthalocyanine tetrasulfonic chloride or metal-free phthalocyanine trisulfonic chloride. Further examples are chloromethylated tetrazaporphin derivatives or those tetrazaporphin derivatives which contain halotriazine or halopyrimidine radicals attached via a bridge member, such as the compound having the formula:

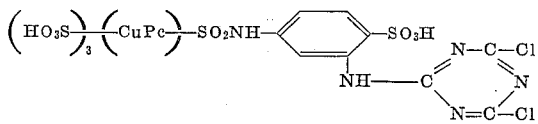

Dye intermediates having reactive atoms or groups or diazotized amines which make possible union with amines having the Formula VI, are compounds which contain for example halogen atoms, carboxylic halide groups, sulfonic halide groups, carboxylic anhydride groups and/or diazo groups. Examples are: leuco-1,4-dioxyanthraquinones, diazotized aromatic and heterocyclic amines, aminobenzene carboxylic chlorides, aminobenzene sulfonic chlorides, phenylmethylpyrazolone sulfonic chlorides, aminohydroxynaphthalene sulfonic chlorides, dihydroxynaphthalene disulfonic chlorides, aminobenzyl chlorides, 2-hydroxynaphthalene-3-carboxylic chloride, chloranil and 3-nitro-6-chlorobenzene sulfonic acid. Diazo compounds of dyes may also be used, for example the tetrazaporphin derivatives obtained by diazotization of compounds having the formula:

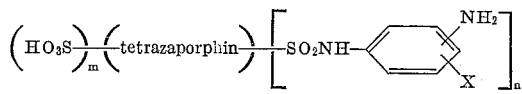

in which X denotes a hydrogen atom or a sulfonic acid group and $m$ and $n$ are whole numbers from 1 to 4 and the sum of $m$ and $n$ is a whole number not more than 6. The compounds capable of coupling for reaction with diazo compounds of amines having the Formula VI are the conventional aliphatic, aromatic and heterocyclic amino and hydroxy compounds capable of coupling, such as aminobenzenes, hydroxybenzenes, aminonaphthalenes, hydroxynaphthalenes, pyrazolones and derivatives of acetoacetic acid; dyes containing radicals capable of coupling, such as tetrazaporphin derivatives containing pyrazolone radicals.

Dyes of the azo, anthraquinone and tetrazaporphin series which advantageously contain at least one water-solubilising group, for example a sulfonic acid, carboxylic acid, sulfonamide or sulfato-oxyethyl group, are particularly suitable as dyes containing acylatable primary or secondary amino groups.

Monoazo dyes are industrially important as dyes of the azo series to be acylated according to this invention, but polyazo dyes, such as disazo and trisazo dyes, may also be used. Metal complexes of azo dyes may also be used for the production of dyes according to this invention.

Azo dyes which contain acylatable amino groups in the portion of the molecule corresponding to the diazo component and/or the coupling component are prepared in the conventional way by coupling diazo components with coupling components. Instead of a free acylatable amino group, at least one of the components may also contain a group which is convertible into an acylatable amino group, as for example a formylamino group or a nitro group, which is converted into an acylatable amino group after coupling.

Examples of diazo components which contain, in addition to the diazotizable amino group, a further acylatable amino group, are 1,3-diaminobenzene-4-sulfonic acid, 1,4-diaminobenzene-3-sulfonic acid, 1,4-diaminobenzene and 1,4-diamino-3-nitrobenzene.

Examples of compounds which are convertible into diazo components having acylatable amino groups are: 1 - amino - 4 - nitrobenzene, 1 - amino-3-nitrobenzene, 1-amino - 4-formylaminobenzene, 1-amino-3-formylaminobenzene, 1-amino-4-nitrobenzene-6-sulfonic acid, 1-amino-3-nitrobenzene-6-sulfonic acid, 1-amino-4-acetylaminobenzene-6-sulfonic acid, 1-amino-3-acetylaminobenzene-6-sulfonic acid, 1-methylamino-4-nitrobenzene-6-sulfonic acid, 1-methylamino-3-nitrobenzene-6-sulfonic acid, 1,2-diamino-4-nitrobenzene and 1-amino-2,4-dinitrobenzene.

Examples of coupling components which contain one or more acylatable amino groups are aminohydroxybenzenes, diaminobenzenes, other polyaminobenzenes, aminohydroxynapthalenes, diaminonaphthalenes and other polyaminonaphthalenes, aminophenylmethylpyrazolones and the N-alkyl, or also N-aryl, N-aralkyl and N-cycloalkyl derivatives of these compounds and also the corresponding sulfonic acids, sulfonamides and sulfones.

The said diazo components and coupling components may bear further substituents, such as alkyl groups, aralkyl groups, aryl groups, carboxyl groups, carboxylic acid groups, carboxylic amide groups, carboxylic ester groups, arylamino groups, nitro groups and/or halogen atoms.

Examples of anthraquinone dyes which contain at least one and advantageously up to three water solubilising groups and which contain at least one and advantageously up to two primary and/or secondary amino groups, which are to be reacted with compounds having the Formula VII according to this invention are:

1,5-diaminoanthraquinone-2-sulfonic acid,
1,4-diaminoanthraquinone-2,5-disulfonic acid,
1,4-diaminoanthraquinone-2,6-disulfonic acid,
1-amino-4-(3-amino-4,6-disulfophenylamino)-anthraquinone-2-sulfonic acid,
1-amino-4-(3-aminosulfothiophenyl)-anthraquinone-2-sulfonic acid,
1-amino-4-(4-aminosulfothiophenyl)-anthraquinone-2-sulfonic acid, the reaction products of one mole each of 1-amino-4-bromoanthraquinone-2-sulfonic acid,
1-amino-4-bromoanthraquinone-2-carboxylic acid,
1-amino-4-bromoanthraquinone-2,5-disulfonic acid or
1-amino-4-bromoanthraquinone-2,6-disulfonic acid, with one mole each of an aromatic diamine, such as 1,3-diaminobenzene, 1,4-diaminobenzene, 1,3-diaminobenzene-4-sulfonic acid or 1,4-diaminobenzene-2-sulfonic acid, 2,6-diaminotoluene-4-sulfonic acid, 2,5-diaminobenzene-1,3-disulfonic acid, 1-amino-3-N-methylaminobenzene-4-sulfonic acid, 1-amino-4-N-methylaminobenzene-3-sulfonic acid, 4,4′-diaminodiphenyl sulfide-2,2′-disulfonic acid, 4,4′-diaminostilbene-2,2′-disulfonic acid, 4,4′-diaminodiphenyl-2,2′-disulfonic acid, 4,4′-diaminodiphenylamine and 4,4′-diaminodiphenyl-3-sulfonic acid or an aliphatic diamine, such as ethylene diamine or propylene diamine.

Tetrazaporphin derivatives to be used as initial materials for the acylation according to this invention may be derived for example from metal-free or metalliferrous tetrabenzotetrazaporphins, for example from metal-free phthalocyanines or from iron, cobalt, nickel, copper, chromium, aluminum or zinc phthalocyanines.

Other suitable initial materials are derivatives, containing amino groups, of azophthalocyanines, naphthophthalocyanines or tetrazaporphins containing less than four benzene rings in the molecule, for example derivatives of tetramethyldibenzotetraza nickel porphin, tetraethyldibenzotetraza nickel porphin, tetraphenyldibenzotetraza nickel porphin, dimethyltribenzotetraza nickel porphin, tetramethyltetraphenyltetraza nickel porphin, octaphenyltetraza nickel porphin, octaphenyltetraza copper porphin, and tetramethyltetraphenyltetraza copper porphin. The tetrazaporphin derivatives may contain other substituents in the molecule, such as halogen atoms, nitro groups, alkyl groups, aryl groups and/or arylsulfonyl groups. These compounds may be derived for example from monochloro, dichloro or tetrachloro copper phthalocyanine or from diphenyl, tetraphenyl or tetraphenylsulfonyl copper phthalocyanine.

Examples of tetrazaporphin derivatives having amino groups which contain water solubilising groups, for example sulfonic acid groups, are tetraamino copper phthalocyanine tetrasulfonic acid, bis-aminomethyl copper phthalocyanine disulfonic acid, tris-aminomethyl copper phthalocyanine disulfonic acid, tetrakis-aminomethyl copper phthalocyanine disulfonic acid, bis-aminomethyl copper phthalocyanine trisulfonic acid, tris-aminomethyl copper phthalocyanine trisulfonic acid, tetrakis-aminomethyl copper phthalocyanine trisulfonic acid, bis-aminomethyl copper phthalocyanine tetrasulfonic acid, tris-aminomethyl copper phthalocyanine tetrasulfonic acid, and tetrakis-aminomethyl copper phthalocyanine tetrasulfonic acid. Other tetrazaporphin derivatives suitable as initial materials for the production of the new dyes are unilateral reaction products of tetrazaporphin sulfonic halides and aliphatic or aromatic primary or secondary diamines or diamine sulfonic acids, in which the unreacted sulfonic halide groups have been saponified to sulfonic acid groups. These tetrazaporphin derivatives are obtained for example by reaction of the abovementioned sulfonic halides with unilaterally acylated diamines and subsequent elimination of the acyl radical or by reaction of the said sulfonic halides with nitroamines and subsequent reduction of the nitro group to the amino group. Compounds which may be used as initial materials for the new process are also obtained by the action of aminophenols or aminophenol sulfonic acids on halomethyltetrazaporphins in sulfuric acid according to British patent specification No. 827,569. Similarly, tetrazaporphin dyes, particularly phthalocyanine dyes, which contain one or more aminoazo dye radicals combined therein, may be used for the process according to this invention.

In many cases it is advantageous to prepare the dye containing amino groups first and then to acylate it according to this invention. It is often more favorable to react dye intermediates containing amino groups or dye intermediates capable of being converted into the same, with the compounds having the Formula VII and then to complete the formation of the dye.

Examples of dye intermediates containing amino groups are the diazo components and coupling components containing acylatable amino groups described above. The new dyes may also be obtained by diazotizing acylated diazo components according to this invention and coupling the diazonium products with any coupling components or by coupling any diazo components with coupling components acylated according to this invention. Diazo components acylated according to the invention may be reacted with coupling components acylated according to the invention. Metallizable azo dyes may if desired be metallized after coupling. Examples of diazo components are also diazotizable phthalocyanine derivatives containing amino groups and phthalocyanine derivatives containing groups capable of coupling may be used as coupling components. Phthalocyanine azo dyes are thus obtained.

Other dye intermediates suitable for the process according to the invention are obtainable for example from leuco-1,4-dioxyanthraquinone or leuco-1,4-diaminoanthraquinone with two moles of an aromatic diamine sulfonic acid, such as 1,3-diaminobenzene sulfonic acid, 1,4-diaminobenzene-sulfonic acid, 4,4′-diaminodiphenyl-2-sulfonic acid, or mixtures of the same.

Dye intermediates acylated in accordance with this invention which contain free amino groups may be wholly or partly reacted with, for example, phthalocyanine polyacid halides or anthraquinone polyacid halides and the unreacted acid halide groups may be hydrolyzed. It is also possible for example to prepare a primary condensation product from cyanuric chloride or tetrachloropyrimidine and a phthalocyanine, azo or anthraquinone derivative containing an amino group and advantageously sulfonic acid groups, and then to complete the formation of the dye by reacting the primary condensation product, which still contains amino groups, with a dye intermediate which has been acylated according to this invention.

The new dyes are suitable for dyeing and printing articles, such as fibers, flock, filaments, threads, woven fabrics, knitted fabrics, non-woven fabrics, sheets and mouldings of wool, silk, synthetic polyamides, polyurethanes and leather.

As reactive dyes particularly they yield very level pad dyeing with a high degree of fixing on articles of native or regenerated cellulose in continuous dyeing by the single bath or two-bath method, when using steam or hot air, with various fixing periods and fixing temperatures, and types and amounts of alkali. They are also well suited to printing, exhaustion and pad-batch processes. Although the new dyes are so reactive that they are fixed with sufficient color strength after short periods, the new dyes have good stability in alkaline dye liquors and printing pastes.

The following examples will further illustrate the invention. The parts and percentages given in the examples are units of weight, unless stated otherwise. Parts by volume bear the same relation to parts by weight as the liter (S.T.P.) does to the kilogram.

EXAMPLE 1

Phosgene is passed into a mixture of 100 parts of o-dichlorobenzene, 1 part of dimethylformamide and 26.9 parts of 4-(carboxyphenyl)-2,6-dichloropyrimidine at 90° to 100° C. until disengagement of hydrogen chloride has stopped. Excess phosgene is driven out from the reaction mixture with dry nitrogen. The solution is filtered, the solvent removed in vacuo and ligroin is added to the residue. The acid chloride is filtered off, washed with ligroin and dried for a short time in the air. Pale brownish crystals are obtained having a melting point of 121° to 124° C.

23.3 parts of a dye (obtained by coupling 1-amino-4-acetaminobenzene - 6 - sulfonic acid with 1-(2-methyl-4-sulfophenyl)-3-methylpyrazolone-(5) and subsequent saponification of the acetamino group) is dissolved in 100 parts of water to form a neutral solution. Into this solution at room temperature, a solution of 15.8 parts of the acid chloride obtainable according to the first paragraph of this example in 140 parts of dioxane is allowed to flow in the course of one hour, the pH value of the solution being kept at 6 by simultaneous addition of 10% aqueous sodium carbonate solution. The whole is further stirred until the initial dye cannot be detected by paper chromatography and the new dye having the formula:

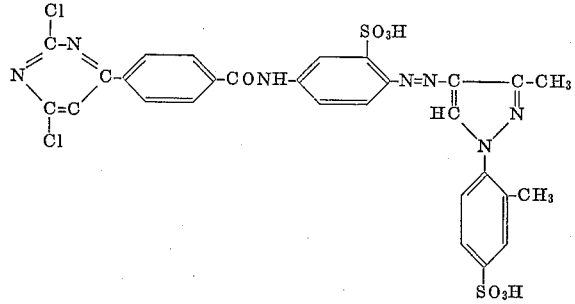

is precipitated by adding a little sodium chloride. The dye gives golden yellow dyeings having very good wet and light fastness on cotton.

EXAMPLE 2

33.6 parts of 4-phenyl-2,6-dichloropyrimidine is dissolved at 0° C. in 200 parts of concentrated sulfuric acid. A mixture of 20 parts of fuming nitric acid ($d=1.5$) and 27 parts of concentrated sulfuric acid is dripped in at 0° C. in the course of two to three hours. The reaction mixture is further stirred for another hour at 0° C. and poured onto ice. The residue is suction filtered and washed with ice-water until the washing water is free from acid. About 40 parts of a pale yellow compound having a melting point of 177° to 185° C. is obtained which after having been recrystallized from dioxane gives pale yellow leaflets having a melting point of 198° to 199° C. 27 parts of this nitro compound is hydrogenated in 135 parts of dioxane using about 5 parts of Raney nickel as catalyst at a pressure of hydrogen of 50 atmospheres gauge. The solution is freed from catalyst and diluted with ice-water. The bright yellow crystals having a melting point of 137° C. which have been precipitated are isolated and dried at 40° C. The yield is 20.2 parts. The amine obtained probably has the formula:

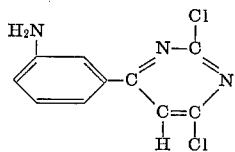

24 parts of this amine is diazotized at 0° to 5° C. in a mixture of 300 parts of ice-water and 25 parts by volume of concentrated aqueous hydrochloric acid with 7 parts of sodium nitrite. The diazonium salt solution is introduced into a mixture prepared from 36.1 parts of 1-acetylamino-8-hydroxynaphthalene-3,6-disulfonic acid, 120 parts of water, 4.4 parts of sodium hydroxide and 16.4 parts of anhydrous sodium acetate. When coupling is over, the reaction product is filtered off, washed with a little water and dried at 40° C. The new dye probably has the formula:

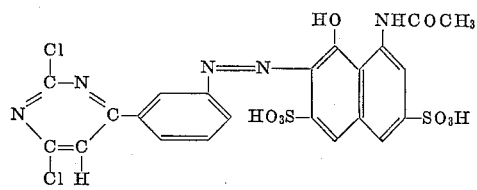

Dyeings and prints in full bluish red shades having excellent wet fastness are obtained with this dye on cotton.

By using, instead of the coupling component specified in this example, the coupling components given in the following table, dyes having similar properties are obtained:

Table 1

| Ex. | Coupling component | Shade on cotton |
|---|---|---|
| 3 | 1-(2-methyl-4-sulfophenyl)-3-methylpyrazolone-(5). | Yellow. |
| 4 | 1-(4-sulfophenyl)-3-methylpyrazolone-(5) | Do. |
| 5 | 1-(2-chloro-5-sulfophenyl)-3-methylpyrazolone-(5). | Do. |
| 6 | 1-(2,6-dichloro-4-sulfophenyl)-3-methylpyrazolone-(5). | Do. |
| 7 | 1-(3-sulfophenyl)-3-methylpyrazolone-(5) | Do. |
| 8 | 1-hydroxynaphthalene-3,8-disulfonic acid | Orange red. |
| 9 | 1-hydroxynaphthalene-3,6-disulfonic acid | Do. |
| 10 | 1-acetamino-8-hydroxynaphthalene-4,6-disulfonic acid. | Red. |
| 11 | 1-benzoylamino-8-hydroxynaphthalene-4,6-disulfonic acid. | Bluish red. |
| 12 | 1-benzoylamino-8-hydroxynaphthalene-3,6-disulfonic acid. | Do. |

EXAMPLE 13

A solution of 31.6 parts of the acid chloride described in Example 1 in 250 parts of dioxane is allowed to drip in the course of one hour into a neutral aqueous solution of 31.9 parts of 1-amino-8-hydroxynaphthalene-3,6-disulfonic acid, the pH value of the solution being kept at 7 by adding a 10% sodium carbonate solution. The reaction product is precipitated by adding a little concentrated aqueous hydrochloric acid and sodium chloride, filtered off and dried. 57 parts of this compound is introduced into a solution of 4.4 parts of sodium hydroxide and 16.4 parts of sodium acetate in 120 parts of water. A diazonium salt solution prepared from 17.3 parts of 1-aminobenzene-2-sulfonic acid is then added and the whole is stirred until coupling is over. The new dye having the formula:

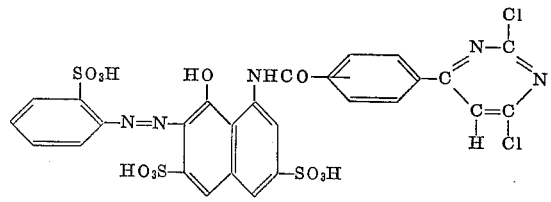

is deposited by adding sodium chloride, suction filtered and dried. It can be fixed on cotton in wet fast bluish red shades.

EXAMPLE 14

214.5 parts of tripropylamine is dripped into a mixture of 94 parts of 2-phenyl-4,6-dihydroxypyrimidine and 500 parts of phosphorus oxychloride in such a way that the temperature does not rise above 70° C. The whole is then boiled for three hours, the cooled mixture is poured onto ice and filtered and the residue washed neutral and dried at about 40° C. About 112 parts of 2-phenyl-4,6-dichloropyrimidine is obtained having a melting point of 90° to 95° C.

33.6 parts of this compound is nitrated as described in Example 2. About 36 parts of the nitro compound is obtained in the form of pale yellow crystals having a melting point of 128° to 129° C. which yield colorless needles having a melting point of 133° to 135° C. after recrystallization from dioxane.

By catalytic hydrogenation of this ntiro compound by the method described in Example 2, in amine is obtained in a very good yield in the form of pale yellow crystals having a melting point of 116° to 119° C. It has the probable formula:

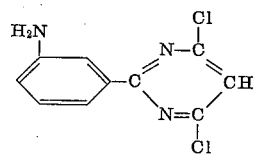

If this amine is diazotized in the usual way and coupled with 1 - acetylamino-8-hydroxynaphthalene-3,6-disulfonic acid, a dye is obtained which dyes cotton bright reddish blue shades. This dye probably has the formula:

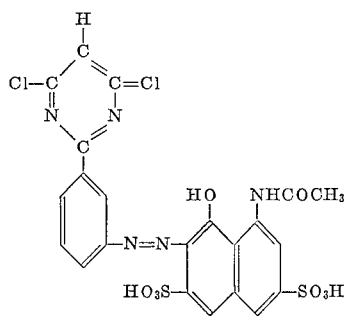

EXAMPLE 15

A mixture of 22.5 parts of 4-phenyl-2,6-dichloropyrimidine and 58 parts of chlorosulfonic acid is heated at 140° C. for six hours. It is then cooled and poured onto ice, the reaction mixture is suction filtered and washed with water until neutral to congo. The product is dried and 22 parts of a pale brownish compound having a melting point of 245° to 248° C. (with decomposition) is obtained which has the probable formula:

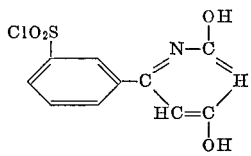

A vigorous stream of phosgene is passed into a mixture of 28.7 parts of this compound, 100 parts of o-dichlorobenzene and 1 part of dimethylformamide for about five hours. When the initial material has dissolved and the disengagement of hydrogen chloride is over, the excess of phosgene is driven out with nitrogen. Animal charcoal is added to the reaction mixture which is then filtered and the filtrate is highly concentrated in vacuo. Ligroin is added in excess and the compound of the probable formula:

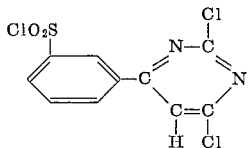

which is precipitated in fine yellowish needles is suction filtered and dried at 40° C. About 23 parts of this compound is obtained having a melting point of 155° to 156° C.

25 parts of 1-amino-4-(2-methyl-3 - amino - 5 - sulfophenylamino)-anthraquinone-2-sulfonic acid is dissolved in 200 parts of water while neutralizing it. 19.4 parts of the sulfochloride obtainable according to the preceding paragraph is added and the mixture is heated to 50° to 60° C., a pH value of 7 being maintained by adding sodium bicarbonate. When initial compound can no longer be detected, the new dye having the probable formula:

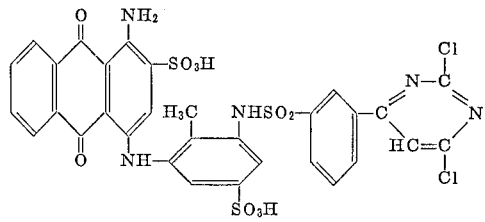

is deposited by adding an excess of hydrochloric acid, suction filtered and dried. It can be fixed on cotton in wet-fast and light-fast blue shades from an alkaline liquor.

Dyes having similar properties are obtained by using equivalent amounts of 1-amino-4-(3-amino-4-sulfophenylamino)-anthraquinone-2 - sulfonic acid, 1 - amino-4 - (3-sulfo-4-aminophenylamino)-anthraquinone - 2,5-, or -2,6-disulfonic acid, or 1-amino-4-(3-amino - 4 - sulfophenylamino)-anthraquinone-2,5- or -2,6-disulfonic acid instead of 25 parts of 1-amino-(2-methyl-3-amino-5-sulfophenylamino)-anthraquinone-2-sulfonic acid.

EXAMPLE 16

15.8 parts of the acid chloride of 2-(carboxyphenyl)-4,6-dichloropyrimidine is added to a neutral solution of a dye obtained by coupling 1-amino-4-acetaminobenzene-6-sulfonic acid with 1-(4-sulfophenyl) - 3 - methylpyrazolone-(5) and subsequent alkaline saponification of the acetamino group. A pH value of 6 to 7 is maintained by adding 10% sodium carbonate solution and after the reaction is over the new dye having the probable formula:

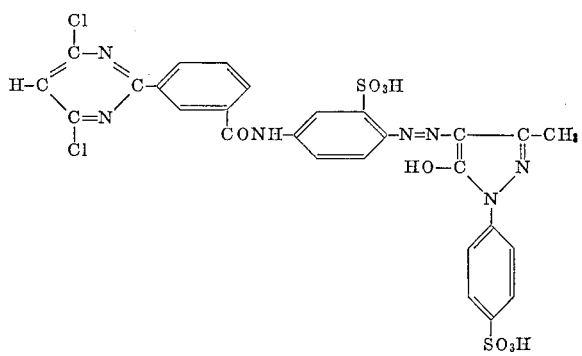

is deposited by adding sodium chloride. It gives wet-fast yellow dyeings on cotton.

EXAMPLE 17

22.5 parts of 2-phenyl-4,6-dichloropyrimidine is heated for six hours at 120° C. in 58 parts of chlorosulfonic acid. The whole is worked up as described in the first paragraph of Example 15. About 18 parts of a compound having the probable formula:

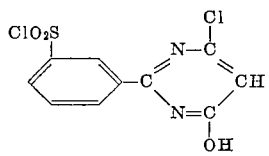

is obtained having a melting point of 165° to 170° C. which may be converted with phosgene by the method described in Example 15 into a compound having the probable formula:

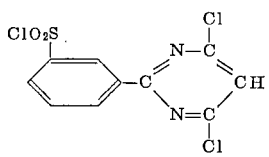

and a melting point of 105° to 115° C.

42.3 parts of a dye obtained by coupling 1-aminobenzene-4-sulfonic acid with 1-hydroxy-3-sulfo-6-acetamino-naphthalene and subsequent alkaline saponification of the acetamino group is dissolved neutral in about 150 parts of water. 38.8 parts of the sulfochloride obtainable according to the preceding paragraph is added and the whole heated to 50° to 60° C. and kept at this temperature until initial compound can no longer be detected. A pH value of 7 to 7.5 is maintained by dripping in 10% sodium carbonate solution. More sulfochloride is added if necessary. The solution is filtered and the dye having the probable formula:

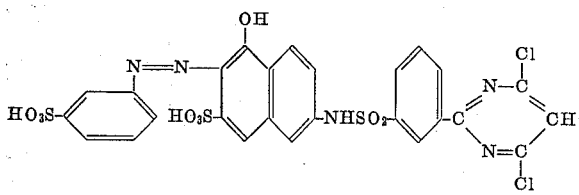

is deposited from the filtrate by adding sodium chloride and hydrochloric acid. The dye is suction filtered, washed with a little water and dried. It gives full and bright orange dyeings on cotton.

EXAMPLE 18

2-p-tolyl-4,6-dihydroxypyrimidine is converted by the method described in Example 14 into 2-p-tolyl-4,6-dichloropyrimidine having a melting point of 81° C. 23.9 parts of this compound is nitrated as described in Example 2. About 25 parts of the nitro compound is obtained in the form of pale yellow crystals having a melting point of 129° to 130° C.

Hydrogenation of this nitro compound by the method according to Example 2 gives a very good yield of an amine which probably has the formula:

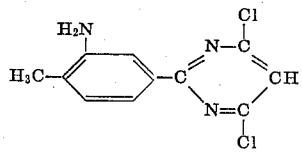

in the form of pale yellow crystals having a melting point of 130° to 131.5° C.

A suspension of 12.7 parts of this amine in 40 parts of glacial acetic acid is added to a mixture of 150 parts of ice-water and 12.5 parts by volume of concentrated aqueous hydrochloric acid. A solution of 3.5 parts of sodium nitrite in 100 parts of water is added and the whole stirred for one hour at 0° to 5° C. The diazonium salt solution is added to a mixture prepared from 16 parts of 1-hydroxynapthalene-3,6-disulfonic acid, 60 parts of water, 2.2 parts of sodium hydroxide and 8.2 parts of sodium acetate. The pH value of the mixture is kept at 4 to 5 by adding about 20 parts of sodium carbonate in the course of two hours. The precipitated dye having the probable formula:

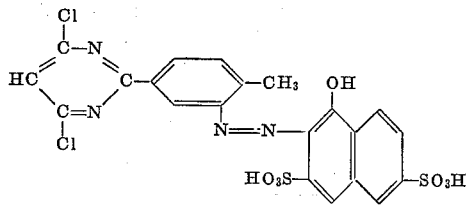

is suction filtered, washed with a little water and dried.

Excellent wet-fast dyeings and prints in full scarlet red shades are obtained on cotton with this dye.

By using 1 - (2 - methyl-5-sulfophenyl)-3-methyl-pyrazolone-(5) or 1 - (2,5 - disulfophenyl)-3-methyl-pyrazolone-(5) instead of 1-hydroxynaphthalene-3,6-disulfonic acid, dyes giving yellow dyeings are obtained, but by using 1-acetylamino-8-hydroxynaphthalene-3,6-disulfonic acid, 1-acetylamino-8-hydroxynaphthalene-4,6-disulfonic acid, 1-benzoylamino-8-hydroxynaphthalene-4,6-disulfonic acid or 1-benzoylamino-8-hydroxynaphthalene-3,6-disulfonic acid instead of 1-hydroxynaphthalene-3,6-disulfonic acid, dyes giving full bluish dyeings are obtained.

EXAMPLE 19

25 parts of copper phthalocyanine is dissolved in 200 parts of chlorosulfonic acid. The solution is heated gradually to 130° to 135° C. within an hour and then kept at this temperature for five hours. The product is cooled, poured onto ice, the precipitate is filtered off and washed with cold water. The moist filtered material is stirred with ice and water, and a solution of 15 parts of 4-(3'-aminophenyl)-2,6-dichloropyrimidine in 100 parts of glacial acetic acid is added. An about 15% aqueous sodium hydroxide solution is dripped in with vigorous stirring and cooling until a pH value of about 6 has been achieved in the reaction mixture. The reaction is then completed at room temperature, the pH value being kept at 6 to 7, if necessary by adding more sodium hydroxide solution or sodium carbonate solution. The dye is precipitated with common salt solution, filtered off and dried. It dyes cotton fast turquoise blue shades.

10 or 20 parts of 4-(3'-aminophenyl)-2,6-dichloropyrimidine may be used instead of 15 parts of this compound, or equivalent amounts of 2-(3'-aminophenyl)-4,6-dichloropyrimidine may be used, and this may be used in solution in acetic acid or acetone.

Other greenish blue dyes are obtained in a similar way by using nickel, cobalt or monochloro-copper phthalocyanine instead of copper phthalocyanine.

EXAMPLE 20

10 parts of 4-(3'-chlorosulfonylphenyl)-2,6-dichloropyrimidine is stirred into a solution in 350 parts of water of 25 parts of the compound having the formula:

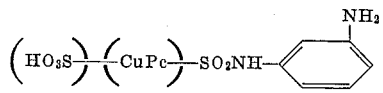

which has been neutralized with aqueous sodium hydroxide solution. The whole is heated to 50° to 60° C. with intense stirring and 25 parts of an about 10% aqueous sodium bicarbonate solution is added in the course of four to five hours. About an equal volume of aqueous sodium chloride solution is added to the dye solution and the precipitated dye is filtered off at room temperature, washed with dilute hydrochloric acid and dried. About 35 parts of a water-soluble dye is obtained with which very fast turquoise blue dyeings are obtained on cotton by dyeing methods conventionally used for reactive dyes.

Other dyes are obtained in an analogous way by using the isomeric 2 - (3'-chlorosulfonylphenyl)-4,6-dichloropyrimidine instead of the acid chloride used in the first paragraph of this example or by using the following phthalocyanine derivatives:

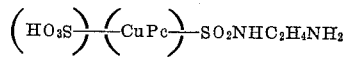

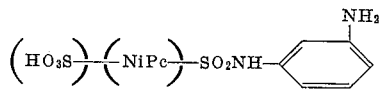

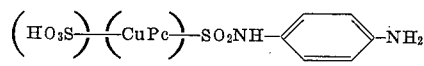

instead of the phthalocyanine compound used in the first paragraph of this example.

EXAMPLE 21

26.4 parts of tetraphenyl copper phthalocyanine is heated in 220 parts of chlorosulfonic acid for five hours at 135° C. and this mixture then stirred into ice. The phthalocyanine sulfonic acid chloride thus obtained is filtered off and washed with ice-water. The moist filtered material is stirred with ice and an acetic acid solution of 14.5 parts of 4-(3'-aminophenyl)-2,6-dichloropyrimidine and neutralized with 10% aqueous soduim hydroxide solution. 15 parts of sodium bicarbonate is then added and the whole stirred at room temperature until a sample diluted with water is soluble. The product is salted out with a little sodium chloride. The residue is filtered off and dried. The dye thus obtained dyes cotton light-fast green shades. It has the formula:

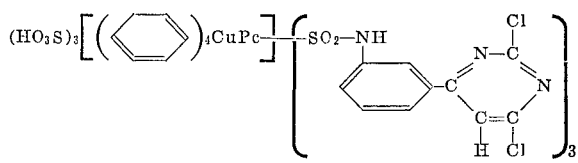

By using tetraphenyl nickel phthalocyanine, tetraphenylmercapto copper phthalocyanine, diphenyl copper phthalocyanine, triphenyl copper phthalocyanine, diphenyl nickel phthalocyanine or triphenyl nickel phthalocyanine instead of tetraphenyl copper phthalocyanine, other green dyes are obtained in an analogous way.

EXAMPLE 22

12 parts of 4-(3'-aminophenyl)-2,6-dichloropyrimidine is diazotized in 150 parts of ice-water and 15 parts of concentrated hydrochloric acid with 15 parts by volume of a 23% solution of sodium nitrite in water. The diazo solution is tirred into a cold neutral solution which contains 400 parts of water and 30 parts of the compound having the formula:

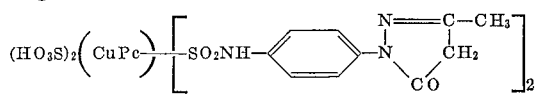

15 parts of crystallized sodium acetate is added and coupling is completed at room temperature. The dye is filtered off and dried. It dyes cotton green shades fast to wet treatments.

EXAMPLE 23

30 parts of the compound having the formula:

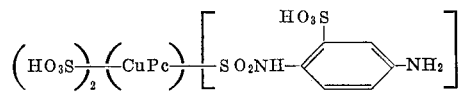

is dissolved in 400 parts of water with an addition of sodium carbonate to render the whole neutral, and 20 parts of 4 - (3'-chlorosulfonylphenyl)-2,6-dichloropyrimidine is added. The phthalocyanine dye containing amino groups is sulfamidated at pH 7 to 8 with an addition of sodium carbonate and at temperatures between 50° and 60° C. The dye is salted out, filtered off and dried. It dyes cotton light-fast and wet-fast turquoise shades.

Other dyes are obtained in a similar way by using the amounts of the compounds specified in the following Table 2 instead of 30 parts of the dye components given above:

EXAMPLE 24

16 parts of sodium acetate trihydrate is added to a solution of the dye obtainable according to Example 10 in 500 parts of water and then a solution of 10 parts of copper sulfate pentahydrate in 40 parts of hot water is added. About 28 parts by volume of a 10% hydrogen peroxide solution is then dripped in gradually and the whole is further stirred until initial material cannot be detected by chromatography. The new dye which probably has the formula:

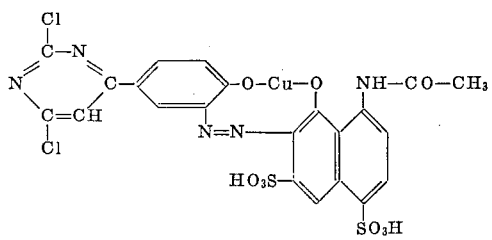

is precipitated by adding about 64 parts of concentrated hydrochloric acid and 160 parts of sodium chloride, suction filtered and dried.

The dye gives full red-violet dyeings and prints on cotton.

From initial dyes having the same diazo components and the coupling components set out in the following Table 3, the corresponding copper complexes of the o,o'-dihydroxyazo dyes may be obtained:

Table 3

| Coupling component: | Shade of dyeing of copper-containing dihydroxy dye |
|---|---|
| 1-hydroxynaphthalene-3,8-disulfonic acid | Ruby |
| 2-hydroxynaphthalene-3,6-disulfonic acid | Ruby |
| 1-acetamino-8-hydroxynaphthalene-3,6-disulfonic acid | Violet |
| 1-(2-methyl-4-sulfophenyl)-3-methylpyrazolone-(5) | Brown |

EXAMPLE 25

The dye paste obtainable by coupling the diazo compound from 24 parts of the amine described in Example 14 with 30.4 parts of 1-hydroxynaphthalene-4,8-disulfonic acid is dissolved in water with the addition of 40 parts of sodium acetate trihydrate. 25 parts of copper sulfate pentahydrate dissolved in 100 parts of hot water is added; the copper complex of the monohydroxyazo dye is precipitated. About 100 parts by volume of 10% hy-

*Table 2*

| Parts | Compound | Shade on cotton |
|---|---|---|
| 30 | $(HO_3S)_2(NiPc)[SO_2-NH-C_6H_3(HO_3S)(NH_2)]_2$ | Greenish blue. |
| 50 | $(HO_3S)_2(CuPc)SO_2NH-C_6H_3(HO_3S)(NH_2)$ | Turquoise. |
| 70 | $(HO_3S)_4[(C_6H_5)_4CuPc][SO_2NH-C_6H_4-NH_2]_2$ | Green. |
| 65 | $(HO_3S)_4[(C_6H_5)_4CuPc](SO_2NHC_2H_4NH_2)_2$ | Do. | drogen peroxide is then gradually dripped in; the whole is further stirred until initial material can no longer be detected. The new dye has the probable formula:

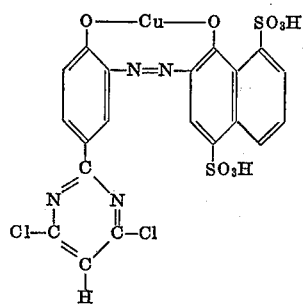

and is precipitated by adding sodium chloride. It gives ruby red dyeings and prints on cotton.

A dye having similar shading is obtained by using 1-acetamino-8-hydroxynaphthalene-4,6-disulfonic acid instead of 1-hydroxynapththalene-4,8-disulfonic acid.

EXAMPLE 26

15.8 parts of the acid chloride of 4-(carboxyphenyl)-2,6-dichloropyrimidine is added to a neutral solution of 32 parts of 1-amino-4-(3,2'-disulfo-4'-aminodiphenylamino)-anthraquinone-2-sulfonic acid in 200 parts of water. A pH of 7 to 7.5 is maintained by dripping in a 20% sodium carbonate solution and when the reaction is over the dye having the formula:

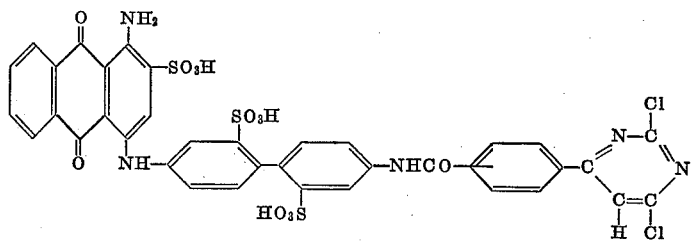

is precipitated by adding potassium chloride. The dye is suction filtered and dried at 40° to 50° C. The dye dyes cellulose fibers wet-fast and light-fast blue shades.

Other blue dyes having similar properties are obtained by using, instead of 32 parts of 1-amino-4-(3,2'-disulfo-4' - aminodiphenylamino)-anthraquinone-2-sulfonic acid, equivalent amounts of 1-amino-4-(3-amino-4-sulfophenylamino) - anthraquinone - 2 - sulfonic acid, 1 - amino-4-(3-sulfo - 4 - aminophenylamino)-anthraquinone-2,5- or -2,6-disulfonic acid, 1-amino-4-(3-amino-4-sulfophenylamino)-anthraquinone-2,5- or -2,6-disulfonic acid, 1-amino-4-(2-methyl - 3-amino-5-sulfophenylamino)-anthraquinone-2-sulfonic acid, 1 - amino - 4 - (3 - aminophenylamino)-anthraquinone-2,5-disulfonic acid, 1-amino-4-(2-chloro-3-amino - 5-sulfophenylamino)-anthraquinone-2,5-disulfonic acid, 1 - amino - 4 - (3-sulfo-4-amino)-anthraquinone-2-sulfonic acid, 1-amino-4-(3-sulfo-4-methylaminophenylamino)-anthraquinone-2,5- or -2,6-disulfonic acid or 1-amino - 4 - (3-methylamino-4-sulfophenylamino)-anthraquinone-2,5- or -2,6-disulfonic acid. Grey dyes are obtained by starting from 1-amino-4-(2'-sulfo-4'-amino-aminodiphenylamino) - anthraquinone - 2,5- or -2,6-disulfonic acid.

EXAMPLE 27

19 parts of 1,3-diaminobenzene-4-sulfonic acid is dissolved in 190 parts of water with an addition of 5.6 parts of sodium carbonate. 30.3 parts of the acid chloride of 4-(carboxyphenyl) - 2,6-dichloropyrimidine is added and the pH is kept at 6.5 to 7 by adding sodium carbonate. Three hours later, a solution of 7 parts of sodium nitrite in 20 parts of water is added and the reaction mixture is poured onto a mixture of 100 parts of ice and 25 parts by volume of concentrated aqueous hydrochloric acid. The diazonium salt solution thus obtained is introduced into a mixture which has been prepared from 57 parts of the compound obtained according to Example 13 from 1-amino-8-hydroxynaphthalene-3,6-disulfonic acid and the acid chloride of 4-(carboxyphenyl)-2,6-dichloropyrimidine, 120 parts of water, 16 parts of sodium acetate and 4.4 parts of sodium hydroxide. The dye having the formula:

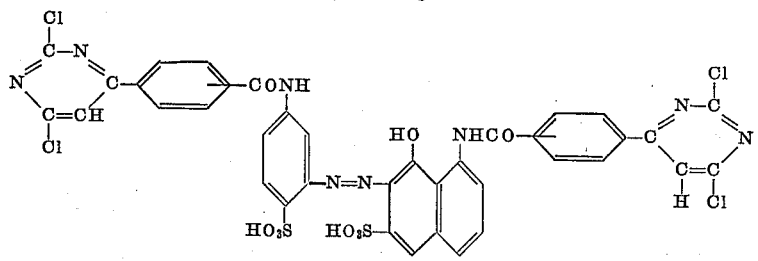

is obtained which can be fixed on cotton in red violet shades. Dyes which dye cotton in the shades stated are obtained by diazotization of the amine having the formula:

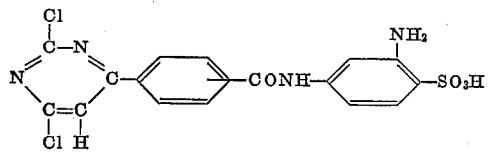

and coupling with the compounds given in the following Table 4:

Table 4

| Ex. | Coupling component | Shade on cotton |
|---|---|---|
| 28 | 1:phenyl-3-methylpyrazolone-(5) | Yellow. |
| 29 | 1-(2,5-disulfophenyl)-3-methylpyrazolone-(5). | Do. |
| 30 | 1-(2-methyl-4-sulfophenyl)-3-methylpyrazolone-(5). | Do. |
| 31 | 1-hydroxynaphthalene-4-sulfonic acid | Red. |
| 32 | 2-hydroxynaphthalene-6-sulfonic acid | Red. |
| 33 | 1-hydroxynaphthalene-3,8-disulfonic acid | Orange red. |
| 34 | 1-acetamino-8-hydroxynaphthalene-4,6-disulfonic acid. | Bluish red. |
| 35 | 1-acetamino-8-hydroxynaphthalene-3,6-disulfonic acid. | Do. |
| 36 | 2-aminonaphthalene-5,7-disulfonic acid | Yellow orange. |

EXAMPLE 37

The acid chloride of 4-(carboxyphenyl)-2,6-dichloropyrimidine is reacted with 1,4-diaminobenzene-3-sulfonic acid in the molar ratio of 1:1. The compound having the formula:

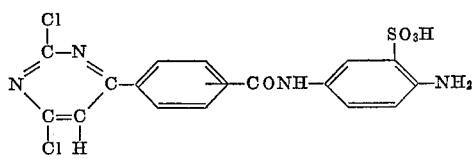

is obtained. By diazotizing this compound and coupling with the compounds given in the following Table 5, dyes are obtained with which cotton can be dyed in the shades indicated.

Table 5

| Ex. | Coupling component | Shade on cotton |
|---|---|---|
| 38 | 1-(4-sulfophenyl)-3-methylpyrazolone-(5) | Yellow. |
| 39 | 1-(2,6-dichloro-4-sulfophenyl)-3-methyl-pyrazolone-(5). | Do. |
| 40 | 1-(2-chloro-5-sulfophenyl)-3-methylparazol-one-(5). | Do. |
| 41 | 1-hydroxynaphthalene-3,8-disulfonic acid | Red. |
| 42 | 1-hydroxynaphthalene-3,6-disulfonic acid | Red. |
| 43 | 1-acetamino-8-hydroxynaphthalene-4,6-disulfonic acid. | Red. |
| 44 | 1-benzoylamino-8-hydroxynaphthalene-4,6-disulfonic acid. | Bluish red. |
| 45 | 1-acetamino-8-hydroxynaphthalene-3,6-disulfonic acid. | Do. |
| 46 | 1-benzoylamino-8-hydroxynaphthalene-3,6-disulfonic acid. | Do. |

EXAMPLE 47

34.4 parts of 1,4-di-(2-methyl-3-amino-5-sulfophenyl-amino)-anthraquinone-6-sulfonic acid is dissolved neutral in 600 parts of water. First 30.3 parts of the acid chloride of 2-(carboxyphenyl)-4,6-dichloropyrimidine is added and then while stirring a pH value of 7 to 7.5 is maintained by adding a 20% sodium carbonate solution until the reaction is over. A dye is obtained which has the formula:

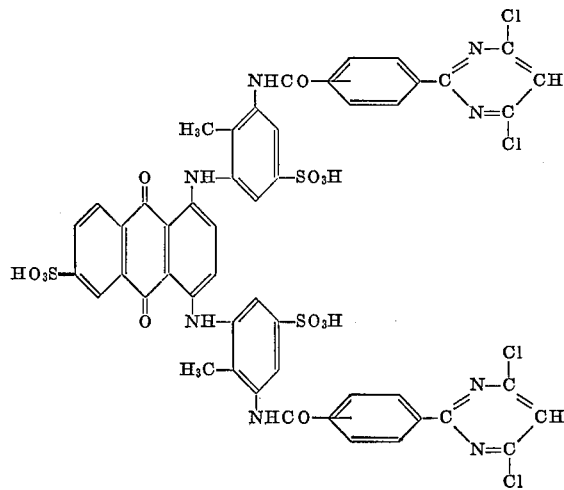

and which dyes cotton green shades.

EXAMPLE 48

The acid chloride of 2-(carboxyphenyl)-4,6-dichloro-pyrimidine is reacted with 1-hydroxy-6-aminonaphthalene-3-sulfonic acid. A compound having the formula:

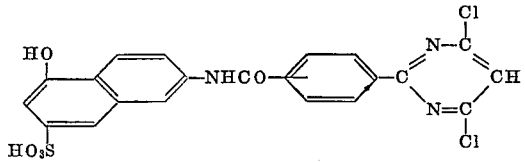

is obtained which when coupled with the diazotized amines given in the following Table 6 gives dyes which dye cotton in the shades specified:

Table 6

| Ex. | Diazo component | Shade on cotton |
|---|---|---|
| 49 | 1-aminobenzene-2,4-disulfonic acid | Orange. |
| 50 | 1-aminobenzene-2-sulfonic acid | Do. |
| 51 | 1-amino-3-acetaminobenzene-6-sulfonic acid | Do. |

EXAMPLE 52

42 parts of the compound obtained by diazotization of 2-aminonaphthalene-4,8-disulfonic acid and coupling with 3-aminotoluene in acid solution is reacted with 30.3 parts of the acid chloride of 4-(carboxyphenyl)-2,6-dichloro-pyrimidine to give the dye having the formula:

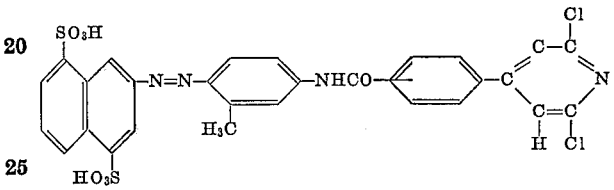

which dyes cotton wet-fast and light-fast yellow shades.

Yellow dyes are also obtained by using 1-amino-naphthalene-3,6-disulfonic acid or 1-aminonaphthalene-6,8-disulfonic acid instead of 2-aminonaphthalene-4,8-disulfonic acid.

EXAMPLE 53

54 parts of the compound having the formula:

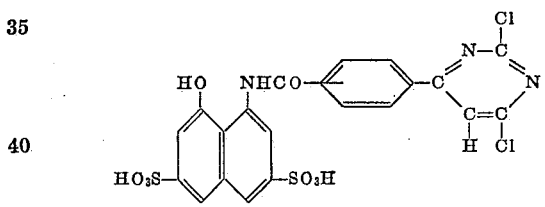

is coupled at 10° C. with a diazonium salt solution prepared from 22 parts of 2-amino-6-nitrophenol-4-sulfonic acid. The dye is isolated, dissolved in about 1400 parts of water, 20 parts of copper sulfate and 40 parts of sodium acetate are added and the whole is heated to 55° C. for one hour. The dye having the formula:

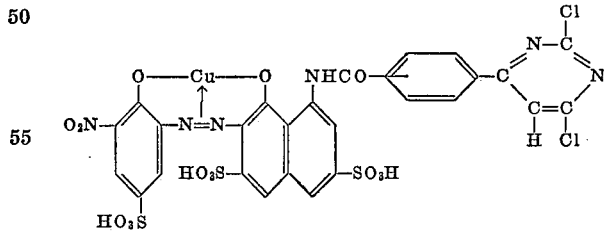

is obtained which dyes cotton violet shades.

EXAMPLE 54

27 parts of the compound having the formula:

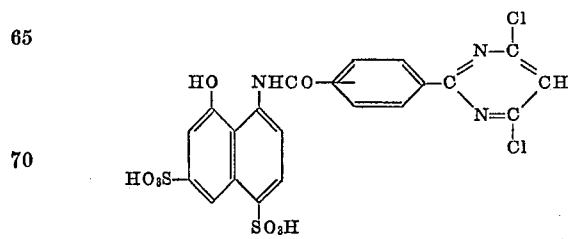

is coupled with a diazonium salt solution prepared from 12 parts of 2-amino-6-nitrophenol-4-sulfonic acid. The dye is isolated, then dissolved in 700 parts of water, 10 parts of cobaltous acetate is added and the whole heated for one hour at 50° to 60° C. A cobalt complex dye is obtained which dyes cotton violet shades.

EXAMPLE 55

80 parts of the compound having the formula:

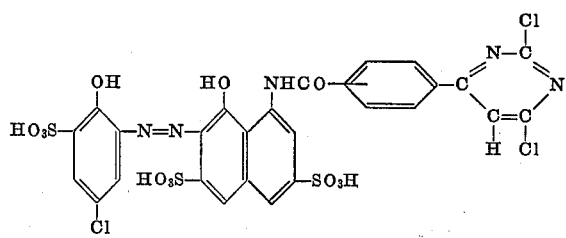

(obtained by coupling the initial compound described in Example 53 with the diazonium salt solution obtained from 2-amino-4-chlorophenol-6-sulfonic acid) is heated for one hour at 95° C. with a solution of 26 parts of chromium trichloride hexahydrate and 40 parts of sodium acetate at a pH of 7 to 8. A chromium complex dye is obtained which dyes cotton blue grey shades.

EXAMPLE 56

36 parts of the compound having the formula:

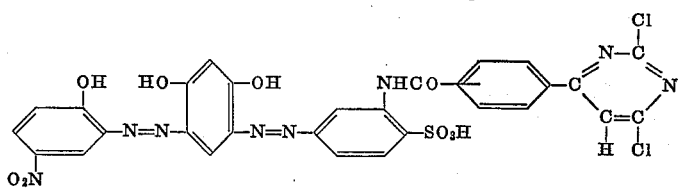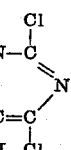

(obtained by coupling resorcinol with the diazonium salt solution of 2-amino-4-nitrophenol and the compound described in Example 28) is heated for one hour at 60° C. in 1200 parts of water to which 7 parts of cobaltous acetate has been added. A cobalt complex dye is obtained which dyes cotton brown shades.

EXAMPLE 57

69 parts of the compound which is obtained by coupling the compound having the formula:

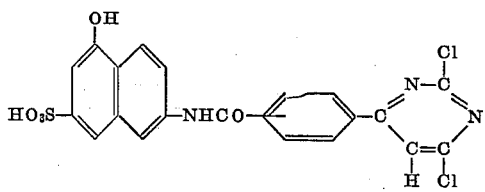

with the diazonium salt solution of 2-aminophenol-4-sulfonic acid is heated for one to two hours at 60° C. in 1900 parts of water with 20 parts of copper sulfate and 40 parts of sodium acetate. A ruby red dye having the formula:

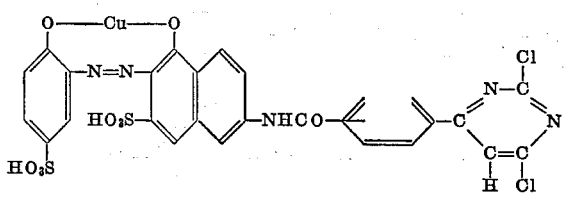

is obtained.

EXAMPLE 58

30 parts of the compound having the formula:

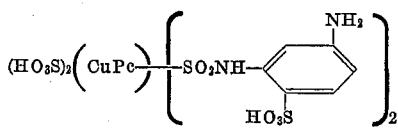

is dissolved neutral in 400 parts of water. 21.6 parts of the acid chloride of 4-(carboxyphenyl)-2,6-dichloropyrimidine or of 2-(carboxyphenyl)-2,6-dichloropyrimidine is added at 40° C., a pH of 7 to 8 being maintained by adding sodium bicarbonate. The dye is precipitated by adding sodium chloride, filtered off and dried. It dyes cotton light-fast and wet-fast turquoise shades.

EXAMPLE 59

A solution of 49 parts of 1-amino-4-(m-toluidino)-anthraquinone-2,5-disulfonic acid in 420 parts of chlorosulfonic acid is stirred for two hours at room temperature and for another two hours at 40° C. The solution is cooled and poured into a mixture of 2500 parts of ice and 100 parts of sodium chloride, filtered off and washed with cold saturated sodium chloride solution. The filter cake is made into a paste which is mixed with an acetic acid solution of 30 parts of the amine described in Example 2. The pH of the mixture is kept by adding sodium carbonate at 4 to 5 and after two hours at 6 to 7, the whole then being stirred for ten hours at room temperature at this pH value. The whole is then heated for one hour at 40° to 50° C. and a dye having the formula:

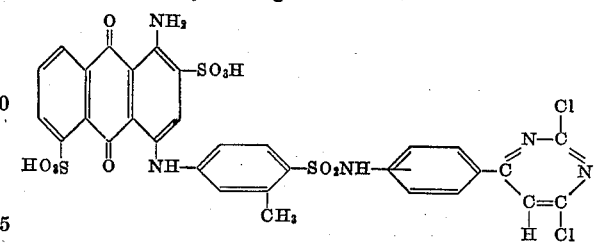

is precipitated by adding potassium chloride. It can be fixed on cotton in reddish blue shades.

EXAMPLE 60

16 parts of diethyl malonate is added at 40° C. to a solution of 6.9 parts of sodium in 90 parts by volume of butanol, and then 18.8 parts of phenylacetamidine hydrochloride is added. The whole is heated for nineteen hours at 105° C., the butanol is distilled off, the residue is dissolved in ice-cold water and 2-benzyl-4,6-dihydroxypyrimidine is precipitated at a pH of 6 by adding concentrated hydrochloric acid. It is filtered off, washed with water until neutral and dried. The substance is obtained in the form of white crystals having a melting point of 311° to 313° C. This compound is converted by the method described in Example 14 into 2-benzyl-4,6-dichloropyrimidine which is obtained in the form of pale brownish crystals having a melting point of 58° to 60° C. 23.9 parts of this compound is introduced in the course of one hour into 90 parts of fuming nitric acid ($d=1.53$) at −10° C. The whole is further stirred at −10° C. for one hour, the solution poured onto ice, suction filtered and washed with water until neutral. About 27 parts of 2-(4-nitrobenzyl)-4,6-dichloropyrimidine is obtained which after recrystallization from dilute alcohol is obtained in the form of pale brownish leaflets having a melting point of 130° to 136° C. This nitro compound may be reduced by the method described in Example 14 into the amine having the formula:

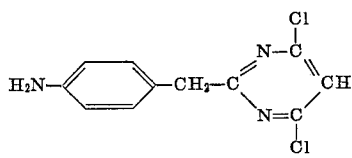

It forms colorless crystals having a melting point of 62° to 65° C.

25.4 parts of this amine is diazotized in a mixture of 300 parts of ice-water and 25 parts of concentrated aqueous hydrochloric acid with 7 parts of sodium nitrite at 0° to 5° C. The diazonium salt solution obtained is introduced into a mixture prepared from 36.1 parts of 1-acetylamino-8-hydroxynaphthalene-3,6-disulfonic acid, 120 parts of water, 4.4 parts of sodium hydroxide and 16.4 parts of anhydrous sodium acetate. A dye having the formula:

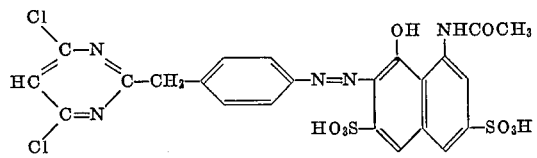

is obtained which dyes cotton full bluish red shades.

EXAMPLE 61

Cotton cloth is impregnated with an aqueous solution which contains in 1000 parts by volume 20 parts of the dye described in Example 3, 20 parts by volume of caustic soda solution (36° Bé.), 30 parts of sodium sulfate and 40 parts of sodium metasilicate. The impregnated cloth is squeezed to a moisture content of about 80% and rolled up. The cloth is rinsed and soaped. A deep yellow dyeing is obtained with good fastness to light and moisture. The maximum color strength is obtained after three hours, and a color strength of 90% after only one hour between impregnation and washing.

EXAMPLE 62

Cotton cloth is impregnated with an aqueous solution which contains in 1000 parts by volume 20 parts of the dye described in Example 9 and 20 parts of sodium carbonate. The impregnated cloth is squeezed out to a moisture content of 80% and dried and treated for two minutes with saturated steam. After rinsing and soaping, a deep scarlet dyeing is obtained having very good wet fastness.

EXAMPLE 63

Cotton cloth is padded with an aqueous solution which contains in 1000 parts by volume 20 parts of the dye described in Example 3, 10 to 20 parts of sodium carbonate and 100 parts of urea. The impregnated cloth is squeezed out to a moisture content of about 80% and dried and thermofixed for two minutes at 120° C. After rinsing and soaping, a deep yellow dyeing is obtained having good light fastness and wet fastness.

I claim:

1. A dye selected from the class consisting of the dyes of the formulae

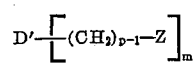

and

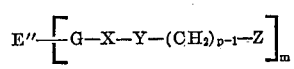

wherein:

D′ represents the radical of an azo dye having one to three sulfonic acid groups, said azo dye containing as the coupling component a napththol sulfonic acid radical or a pyrazolone radical and as the azo component the benzene radical, the benzene-NH-CO-phenyl radical or the benzene-SO$_2$-NH-phenyl radical, all of which may be substituted by halogen, methyl, methoxy, hydroxyl, carboxyl or sulfonamide groups;

E″ is an anthraquinone or phthalocyanine radical, G is phenyl or phenyl substituted by halogen, methyl, methoxy, hydroxyl, carboxyl or sulfonamide groups, E″–G contains 1 to 3 sulfonic acid groups when E″ is an anthraquinone radical and E″–G contains 1 to 6 sulfonic acid groups when E″ is a phthalocyanine group;

X is a bridging group selected from the group consisting of —NH—SO$_2$— and —CO—NH—;

Y is a member selected from the group consisting of 1,4-phenylene, 1,3-phenylene and 1,2-phenylene;

Z is a dihalopyrimidine radical selected from the group consisting of

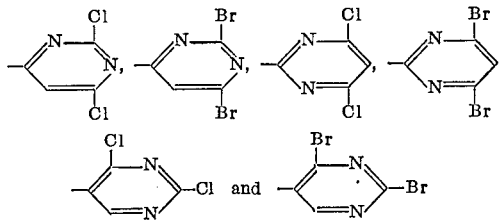

and each of $p$ and $m$ represents a whole number up to 2.

2. The dye of the formula:

$$R—N=B—(CH_2)_{p-1}—Z$$

wherein R is a naphthol or pyrazolone coupling component containing from one to two sulfonic acid groups, B is a bridging group selected from the group consisting of

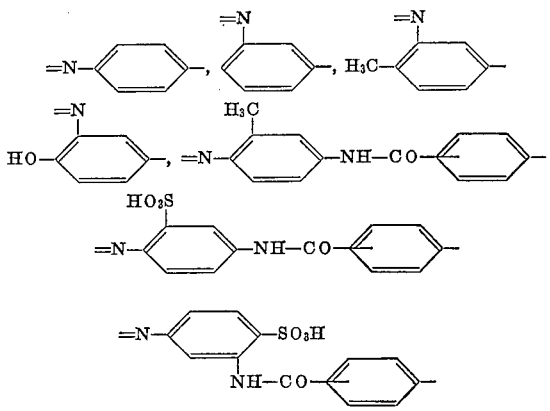

or

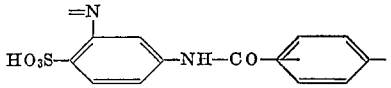

Z is a dihalopyrimidine radical selected from the group consisting of

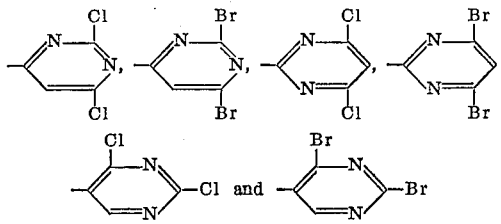

and $p$ represents a whole number up to 2.

3. The dye of the formula

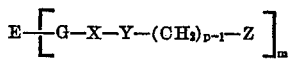

wherein Y is a member selected from the group consisting of 1,4-phenylene, 1,3-phenylene and 1,2-phenylene, X is a bridging group selected from the group consisting of —NH—SO$_2$— and —CO—NH—, E is an anthraquinone radical, G is phenyl or phenyl substituted by halogen, methyl, methoxy, hydroxyl, carboxyl or sulfonamide groups, E–G contains from one to three sulfonic acid groups, Z is a dihalopyrimidine radical selected from the group consisting of

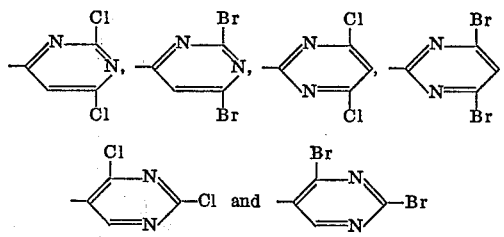

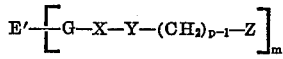

and each of $p$ and $m$ represents a whole number up to 2.

4. The dye of the formula

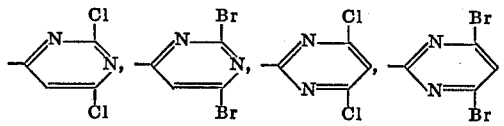

wherein E' is a phthalocyanine radical, G is phenyl or phenyl substituted by halogen, methyl, methoxy, hydroxyl, carboxyl or sulfonamide groups, E–G contains from one to six sulfonic acid groups, Y is a member selected from the group consisting of 1,4-phenylene, 1,3-phenylene and 1,2-phenylene, X is a bridging group selected from the group consisting of —NH—SO$_2$— and —CO—NH—, Z is a dihalopyrimidine radical selected from the group consisting of

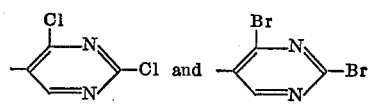

and each of $p$ and $m$ represents a whole number up to 2.

5. The dye having the formula:

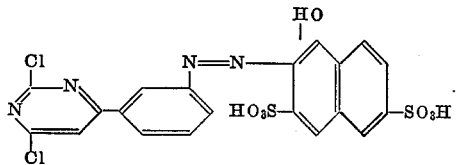

6. The dye having the formula:

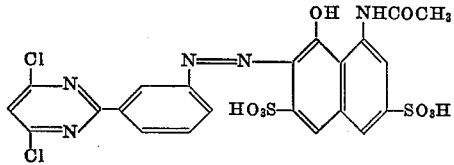

7. The dye having the formula:

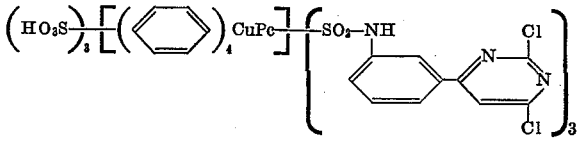

8. The dye having the formula:

9. The dye having the formula:

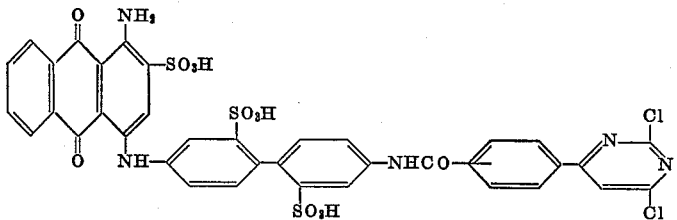

References Cited

UNITED STATES PATENTS 3,126,370    3/1964    Hensel et al. _____ 260—154

CHARLES B. PARKER, *Primary Examiner.*

F. D. HIGEL, *Assistant Examiner.*

UNITED STATES PATENT OFFICE
CERTIFICATE OF CORRECTION

Patent No. 3,336,283                                       August 15, 1967

Hermann Weissauer

It is hereby certified that error appears in the above numbered patent requiring correction and that the said Letters Patent should read as corrected below.

Column 11, lines 28 to 34, for the left-hand portion of the formula reading

      read      

column 20, lines 20 to 26, for that portion of the formula reading

      read      

column 21, lines 66 to 74, for that portion of the formula reading

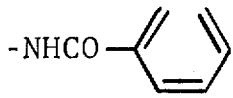      read      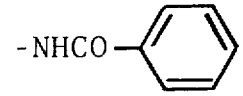

column 22, line 12, for "2,6" read -- 4,6 --.

Signed and sealed this 11th day of February 1969.

(SEAL)
Attest:

EDWARD M. FLETCHER, JR.                          EDWARD J. BRENNER
Attesting Officer                                    Commissioner of Patents